United States Patent
Breuer et al.

(10) Patent No.: US 9,139,056 B2
(45) Date of Patent: Sep. 22, 2015

(54) VEHICLE REGULATING SYSTEM CONTROL DEVICE AND METHOD FOR DETERMINING VEHICLE TIRE STATES

(75) Inventors: Karsten Breuer, Lauenau (DE); Thomas Dieckmann, Pattensen (DE)

(73) Assignee: WABCO GmbH, Hannover (DE)

( * ) Notice: Subject to any disclaimer, the term of this patent is extended or adjusted under 35 U.S.C. 154(b) by 258 days.

(21) Appl. No.: 13/881,100

(22) PCT Filed: Aug. 17, 2011

(86) PCT No.: PCT/EP2011/004140
§ 371 (c)(1),
(2), (4) Date: Apr. 23, 2013

(87) PCT Pub. No.: WO2012/059148
PCT Pub. Date: May 10, 2012

(65) Prior Publication Data
US 2013/0211621 A1    Aug. 15, 2013

(30) Foreign Application Priority Data

Nov. 5, 2010   (DE) .......................... 10 2010 050 634

(51) Int. Cl.
*B60C 99/00* (2006.01)
*B60C 23/02* (2006.01)
(Continued)

(52) U.S. Cl.
CPC ............. *B60C 99/00* (2013.01); *B60C 23/02* (2013.01); *B60T 8/172* (2013.01); *B60W 40/06* (2013.01);
(Continued)

(58) Field of Classification Search
CPC ......... B60C 23/02; B60C 99/00; B60T 8/172; B60T 2210/13; B60T 2210/12; B60T 2240/07; B60W 40/00; B60W 40/02; B60W 40/06; B60W 40/068; B60W 40/12; B60W 2530/20
See application file for complete search history.

(56) References Cited

U.S. PATENT DOCUMENTS 5,652,655 A    7/1997  Uno et al.
6,349,256 B1*  2/2002  Kin et al. .......................... 701/72
(Continued)

FOREIGN PATENT DOCUMENTS

DE    38 41 333 A1    6/1990
DE    100 58 099 A1   5/2002
(Continued)

OTHER PUBLICATIONS

Roadeye, opticalsensors.se, Internet Wayback Archive, Oct. 9, 2010.*
(Continued)

*Primary Examiner* — Khoi Tran
*Assistant Examiner* — Abby Lin
(74) *Attorney, Agent, or Firm* — Kramer Levin Naftalis & Frankel LLP

(57) ABSTRACT

A control device for a vehicle regulating system is configured to pick up driving state measurement signals from driving state sensors of the vehicle and determine reaction properties of the vehicle wheels from the signals. The control device is configured to also pick up roadway measurement signals of a spectroscopic sensor that is aligned with a roadway surface and determine therefrom the presence and/or properties of a layer of water on the roadway surface. The control device determines tire properties of the tires on the basis of the determined reaction properties of the vehicle wheels and the roadway measurement signals.

13 Claims, 3 Drawing Sheets

(51) Int. Cl.
    *B60W 40/06*    (2012.01)
    *B60W 40/12*    (2012.01)
    *B60T 8/172*    (2006.01)

(52) U.S. Cl.
    CPC .......... *B60T 2210/12* (2013.01); *B60T 2210/13* (2013.01); *B60T 2240/07* (2013.01); *B60W 40/12* (2013.01)

(56) References Cited

U.S. PATENT DOCUMENTS

2004/0133324  A1*   7/2004   Yasui et al. ................... 701/41
2006/0261975  A1   11/2006   Fridthjof
2011/0264300  A1*  10/2011   Tuononen ........................ 701/1

FOREIGN PATENT DOCUMENTS

| DE | 101 19 352 C1 | 11/2002 |
| DE | 694 32 465 T2 | 5/2003 |
| DE | 20301710 | 7/2003 |
| DE | 103 14 424 A1 | 10/2004 |
| DE | 10 2004 016 288 B3 | 8/2005 |
| DE | 10 2004 044 788 A1 | 4/2006 |
| DE | 60 2004 009 422 T2 | 11/2007 |
| EP | 1 549 536 B1 | 1/2007 |
| WO | WO 2009/089972 A1 | 7/2009 |

OTHER PUBLICATIONS

Johan Casselgren, Licentiate Thesis: Road surface classification using near infrared spectroscopy, 2007, Lelea University.*

* cited by examiner

VEHICLE REGULATING SYSTEM CONTROL DEVICE AND METHOD FOR DETERMINING VEHICLE TIRE STATES

FIELD OF THE INVENTION

The invention generally relates to a control device for a vehicle regulating system, and to a method for determining tire states of vehicle tires.

BACKGROUND OF THE INVENTION

Vehicle tires serve to transmit all the forces and torques between the vehicle and the roadway. For this reason, monitoring or checking of the tires permits vehicle regulating systems to be set better and, if appropriate, hazardous situations to be detected.

For this purpose it is known, on the one hand, to measure and to monitor the air pressure in vehicle tires. Furthermore, wear sensors are known that, if appropriate, can contribute to detecting a hazardous situation in the case of excessive wear of the tire profile.

DE 101 19 352 C1 describes a method for determining the profile properties of a vehicle tire, wherein microwaves are emitted by close-range radar sensors assigned to the tires, and the profile depth of the vehicle tires can therefore be determined.

DE 100 58 099 A1 describes a method and a device for detecting or estimating abrasion of a tire, in which vehicle movement dynamics variables and other measurement variables that influence the abrasion of the tire are sensed during the normal operation of a vehicle by driving state sensors of the vehicle regulating systems using sensor signals, and the variables are stored and evaluated for approximate detection of the tire state or tire wear.

WO 2009/089972 A1 describes a method for distributing the driving torque among the wheels of a vehicle as a function of the tire state. In this context, tires with low air pressure can be detected automatically by means of air pressure sensors or else on the basis of the wheel speeds. Furthermore, the wear or the profile depth of the individual wheels can be determined by means of a sensor system.

EP 1 549 536 B1 describes improvements of the vehicle stability control, wherein tire force properties are included. In this context, the pressure of a tire is determined by means of a sensor, from which tire forces can be estimated and information about the reaction of the vehicle to a driver input can be estimated, in order to determine an active correction for the wheel lock angle, the braking torque and/or a driving torque.

Furthermore, spectroscopic sensors are known with which surfaces can be detected. Such spectroscopic sensors can also be used from a vehicle.

SUMMARY OF THE INVENTION

Generally speaking, it is an object of the present invention to determine a tire state of a vehicle with relatively low outlay and relatively high safety.

According to an embodiment of the present invention, the roadway surface can be examined spectroscopically. In this context, a spectroscopic sensor is used, in particular, to examine whether a water layer or wetting of the roadway surface with water is present, wherein for this purpose, in particular, the level of the water layer and/or the aggregate state of the water can be determined.

By means of spectroscopic examination in relevant absorption bands of water ($H_2O$), the aggregate state of the water can also be detected. In this context, apart from IR radiation it is also possible to use light in the visible range. It is therefore possible to take into account whether liquid water or else frozen water, i.e., snow or ice, is present, wherein these aggregate states bring about significantly different grip properties of the vehicle tire. Furthermore, the level of the water layer can also be detected spectroscopically since, in the case of spectroscopic examination, a sufficient penetration depth of the emitted IR radiation into a water layer is present, in order to detect a relatively large water depth as a relatively strong signal.

Light or IR radiation can be used for this in at least three different wavelengths, for example 1460 nm for detecting water, 1550 nm for detecting ice, and 1300 nm as a reference wavelength.

The optical sensor can be, in particular, a surface sensor. The use of an optical surface sensor has the advantage that the actual roadway condition can be measured particularly reliably and without contact. In addition, in the case of a stationary vehicle, the optical surface sensor also supplies information about the condition of the roadway. The optical surface sensor can comprise a light source unit for emitting light of at least one wavelength onto the underlying surface, and at least one detector for detecting light reflected by the underlying surface.

The surface sensor can comprise both a first detector and a second detector, wherein the first detector is suitable for sensing diffusely reflected light, and the second detector for sensing light reflected in a mirroring fashion. It is possible to provide at least two polarizers, wherein a first polarizer with a first polarization device is assigned to the first detector. A light source polarizer can be assigned to the light source unit, and/or a second polarizer can be assigned to the second detector. The polarization direction/directions of the second polarizer is/are oriented essentially perpendicular with respect to the first polarization direction of the first polarizer. If at least two polarizers or polarization filters are provided, the first polarizer is arranged on the first detector, which only transmits light waves to the first detector in the first polarization direction. If a light source polarizer is provided on the light source unit, the polarization direction of the light source polarizer is arranged essentially perpendicular with respect to the first polarization direction of the first polarizer, and the light emitted by the sensor is polarized in a direction essentially perpendicular with respect to the first polarization direction, with the result that light that is polarized at the first detector and reflected in a mirroring fashion is filtered out and only diffusely reflected light is detected. A similar effect can be achieved if a second polarizer is arranged in front of the second detector and its polarization direction is oriented essentially perpendicular with respect to the first polarization direction. The second polarizer can be used as an alternative to, or in addition to, the light source polarizer. It is also possible to provide for light that is already polarized to be generated in the light source unit. The light source unit can be configured to emit light of at least two different wavelengths or to emit a plurality of wavelengths onto the underlying surface or the roadway surface. For this purpose, the light source unit can comprise, for example, a plurality of light sources. The use of at least two wavelengths, preferably three different wavelengths, permits the sensor to be operated in a spectral fashion. By using wavelengths that are, for example, particularly well absorbed by ice or water, ice or water on the roadway or roadway surface can be detected if the reflected light with the wavelength absorbed by the water or ice is compared with that of a reference wavelength. It is therefore possible to implement the principles of the spectral analysis and of diffuse reflection and mirroring reflection in only one device or a single housing. The light source unit, the first detector and, if appropriate, the second detector can for this purpose be arranged, for example, directly next to one another in a common single and/or single-piece housing.

It is possible to use light in at least three different wavelengths in the infrared range. The light source unit can, for this purpose, comprise a plurality of light sources. For example, the light source unit can be configured to emit infrared light with the wavelengths 1300 nm, 1460 nm and 1550 nm, while light with the wavelength 1460 nm is particularly well absorbed by water, and light with the wavelength 1550 nm is well absorbed by ice. Light in the region of approximately 1300 nm can then be used as a reference wavelength. However, other wavelengths can also be used. In particular, for the reference wavelength it is possible to use any other wavelength that is appreciably absorbed neither by ice nor by water. Any other wavelength that is absorbed to an increased degree in water can also be used as a water-sensitive wavelength. Likewise, any wavelength that is absorbed to an increased degree in ice can be selected as an ice-sensitive wavelength. Other wavelengths of interest comprise, for example, 1190, 1040, 970, 880 and 810 nm in the infrared range as well as the visible wavelengths 625, 530 and 470 nm.

The light source unit can be configured to emit light with precisely three different wavelengths. For this purpose, the light source unit can have three light sources, one light source for each wavelength. Only the three wavelengths are used in order to sense both light that is reflected spectrally and light that is reflected in a mirroring/diffuse fashion, in order to determine and/or detect both the condition of the roadway and the type of the roadway. Any of the light sources can be actuatable individually and can be capable of being switched on and off independently of the others and/or can be regulated in terms of their intensity.

Furthermore, more than the abovementioned two or three different wavelengths can also be used. For example, the wavelength 625 nm can also be used to measure the light reflected in a diffuse and mirroring fashion.

It is also possible to provide for the emitted light to be modulated in intensity and/or amplitude. The modulation of the intensity or amplitude can take place by switching all of the light sources or individual light sources of the light source unit on and off. The modulation of the intensity or the switching on and off can take place separately for each wavelength of the light source unit or for each light source of the light source unit. For example, the modulation of the amplitude or intensity or the switching on and off can take place at the same frequency but with a phase shift and/or at different frequencies for each wavelength. As a result, it is possible to ensure, for example, that the light with different wavelengths is emitted in a chronologically staggered fashion or sequentially. For example, it is possible to provide for light with a first wavelength to be emitted for a specific time interval and then the light with the first wavelength to be switched off and a second wavelength to be switched on etc. In each case light of just one wavelength is then detected in the detectors. As a result, a spectral analysis or splitting of the incident light at the detectors can be avoided. Mixed forms of different modulation techniques can also be applied, in particular frequency-modulated and amplitude-modulated optical signal lines with or without interruptions.

It is therefore also possible to use simple detectors as the first or second detector. For example, photodiodes can be used. The first detector and the second detector can each comprise one or more photodiodes. At least the first detector can be configured to sense light with all the wavelengths emitted by the light source unit. The detector can also alternatively or additionally comprise an optoelectronic chip (for example CCD) or some other optical recording device.

The first and the second detector can be used to sense and/or determine light that is reflected in a mirroring fashion and light that is reflected in a diffuse fashion. In addition, at least one of the first and second detectors can also be used for the spectral determination. At least this detector is then configured to detect light with a plurality of wavelengths. In this example, the sensor has precisely the first detector and the second detector and no further detectors are provided.

The surface sensor can also comprise an evaluation device that outputs information about the condition of the roadway surface or the underlying surface.

The surface sensor is also suitable for detecting the thickness of a water film on the roadway surface or the thickness of an ice layer, with the result that, for example in the case of a wet roadway, the information is not transmitted to the vehicle driver until there is a specific water film thickness at which, for example, aquaplaning can arise.

According to the inventive embodiments, it is therefore possible to evaluate a reaction of the tires to respectively acting longitudinal forces and/or lateral forces or corresponding torques. For this purpose, the forces and torques acting at the tires are determined from the vehicle movement dynamics measurement variables and/or driving state measurement variables of the vehicle sensors, and also the reaction of the vehicle or its wheels to these acting forces and torques. The slip behavior of the individual tires can therefore be determined, in particular as frictional values and/or as grip in the wet, but also in the longitudinal direction and/or lateral direction, wherein this slip behavior can be determined, in particular, as a function of the state of the water and then relate to the acting forces and/or torques. For example, the loss of grip in the wet, risk of aquaplaning or lack of all-year properties (off-road and snow) can be determined.

As a result, actual values that are determined for the slip behavior or coefficient of friction behavior can be compared with the determined properties of the roadway surface, i.e., in particular a possibly present water layer and the level and aggregate state thereof.

This comparison permits, on the one hand, conclusions to be made about the tire state; it is possible to determine whether the tire state, in particular the profile depth, permits the behavior or the coefficient of friction that is to be expected with the given surface state or wetting of the roadway surface with water. The tire state can therefore be evaluated for the given water conditions. For this purpose, setpoint values or stored reference values relating to the behavior of a tire on roadways can advantageously be compared as a function of corresponding water properties, i.e., corresponding level and relevant aggregate state of the water layer present.

Since, therefore, the tire state is known, it is possible, on the one hand, to output a warning signal when a very poor tire state is detected, i.e., a high degree of abrasion of the profile depth and/or hardening of the tread rubber mixture. Furthermore, the assessment of the tire state can also be taken into account in the vehicle regulating system, for example a vehicle stability system or ABS. As a result, the prevailing frictional engagement potential of the tires can be utilized better; the regulating process can permit forces and/or torques, which occur in principle, to such an extent that they utilize this frictional engagement potential or the individual coefficients of friction on the respective roadway states.

The coefficient of friction behavior or behavior of the tire on the roadway is therefore determined directly without having to have recourse to theoretical data such as the age of the tire or data about the rubber mixture of the tires for this purpose. This permits advantages since data about the aging of the tire do not always also take into account the actual loads and the actual wear and the aging owing to unfavorable weather states such as temperature effects or solar radiation effects on the tires.

The properties of the vehicle tire, in particular also relating to the loss of grip in the wet, risk of aquaplaning or lack of off-road and snow properties, can furthermore also be indicated and/or logged.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

The invention will be explained in more detail below using an embodiment and with reference to the appended drawings, of which.

DETAILED DESCRIPTION OF THE PREFERRED EMBODIMENTS

Figure 1:
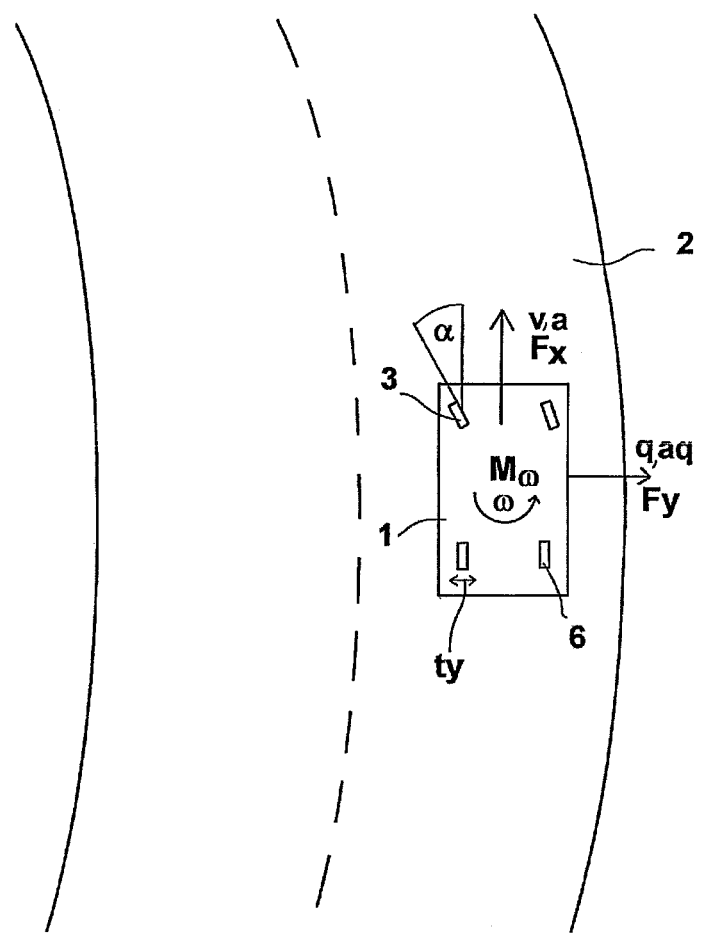
FIG. 1 shows a vehicle according to an embodiment of the invention on a roadway in a plan view.
Figure 2:
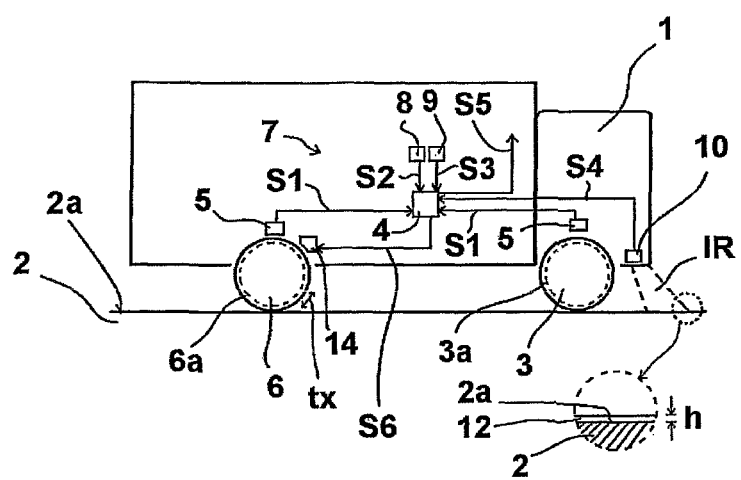
FIG. 2 shows a side view of the vehicle depicted in FIG. 1.

A vehicle 1 is traveling on a roadway 2, for example on a bend with steering wheel lock and obliquely positioned front wheels 3. The vehicle 1 has a vehicle movement dynamics regulating system and/or driving stability regulating system having a control device 4, ABS sensors 5 on preferably all the wheels, i.e., the front wheels 3 and rear wheels 6, as well as further vehicle movement dynamics sensors, for example a yaw rate sensor 8 for measuring a yaw rate $\omega$ to as well as a lateral acceleration sensor 9 for measuring a lateral acceleration aq.

Furthermore, a spectroscopic sensor 10 is provided in the vehicle 1, and is directed at the roadway 2, for example in the front region of the vehicle 1. The spectroscopic sensor 10 preferably operates in the IR (infrared) wavelength range and detects absorption bands of water ($H_2O$) by emitting IR radiation IR and detecting IR radiation IR reflected by the roadway surface 2a of the roadway 2.

The ABS sensors 5 output wheel speed measurement signals S1 as first measurement signals to the control device 4; correspondingly the yaw rate sensor 8 outputs a yaw rate measurement signal S2 as the second measurement signal, and the lateral acceleration sensor 9 outputs a lateral acceleration measurement signal S3 as the third measurement signal to the control device 4.

The spectroscopic sensor 10 outputs a roadway measurement signal S4 as the fourth measurement signal to the control device 4. In contrast to the measurement signals S1, S2, S3, measurement signal S4 does not supply any driving state variable of the vehicle 1, but instead supplies data about the spectroscopic composition of the roadway surface 2a of the roadway 2. The spectroscopic sensor 10 is advantageously configured such that it detects the concentration of water on the roadway surface 2a, in particular also the level h of a water film 12, or as part of the roadway surface 2a. Furthermore, the measurement signals S4 of the spectroscopic sensor 10 contain information about the aggregate state of the water film 12 or of water on the roadway surface 2a. The spectroscopic sensor 10 can therefore detect, for example, whether the water or the water film 12 is or is not frozen.

The spectroscopic sensor 10 has a light source unit and one or more detectors. The light source unit can use light in at least three different wavelengths in the infrared range or else in the visible range. The light source unit can, for this purpose, comprise a plurality of light sources. For example, the light source unit can be configured to emit IR radiation with the wavelengths 1300 nm, 1460 nm and 1550 nm. While IR radiation with the wavelength 1460 nm is absorbed particularly well by water, IR radiation with the wavelength 1550 nm is well absorbed by ice. IR radiation in the region of approximately 1300 nm can then be used as a reference wavelength. However, other wavelengths can also be used. In particular for the reference wavelength, it is possible to use any other wavelength that is appreciably absorbed neither by ice nor water. Any other wavelength that is absorbed to an increased degree in water can also be used as a water-sensitive wavelength. Likewise, any wavelength that is absorbed to an increased degree in ice can be selected as an ice-sensitive wavelength. Other wavelengths of interest comprise, for example, 1190, 1040, 970, 880 and 810 nm in the infrared range as well as the visible wavelengths 625, 530 and 470 nm.

A velocity v of the vehicle 1 can be formed, for example, from the wheel speed measurement signals S1 and/or a rotational speed of an output shaft of the vehicle transmission. A longitudinal acceleration a can correspondingly be determined therefrom.

For example, a slip angle $\alpha$ of the front wheels 3 is also determined from the steering wheel lock or from a suitable sensor. Furthermore, the mass, wheel base and track width of the vehicle may be known and stored in the control device 4 or an external memory.

Figure 3:
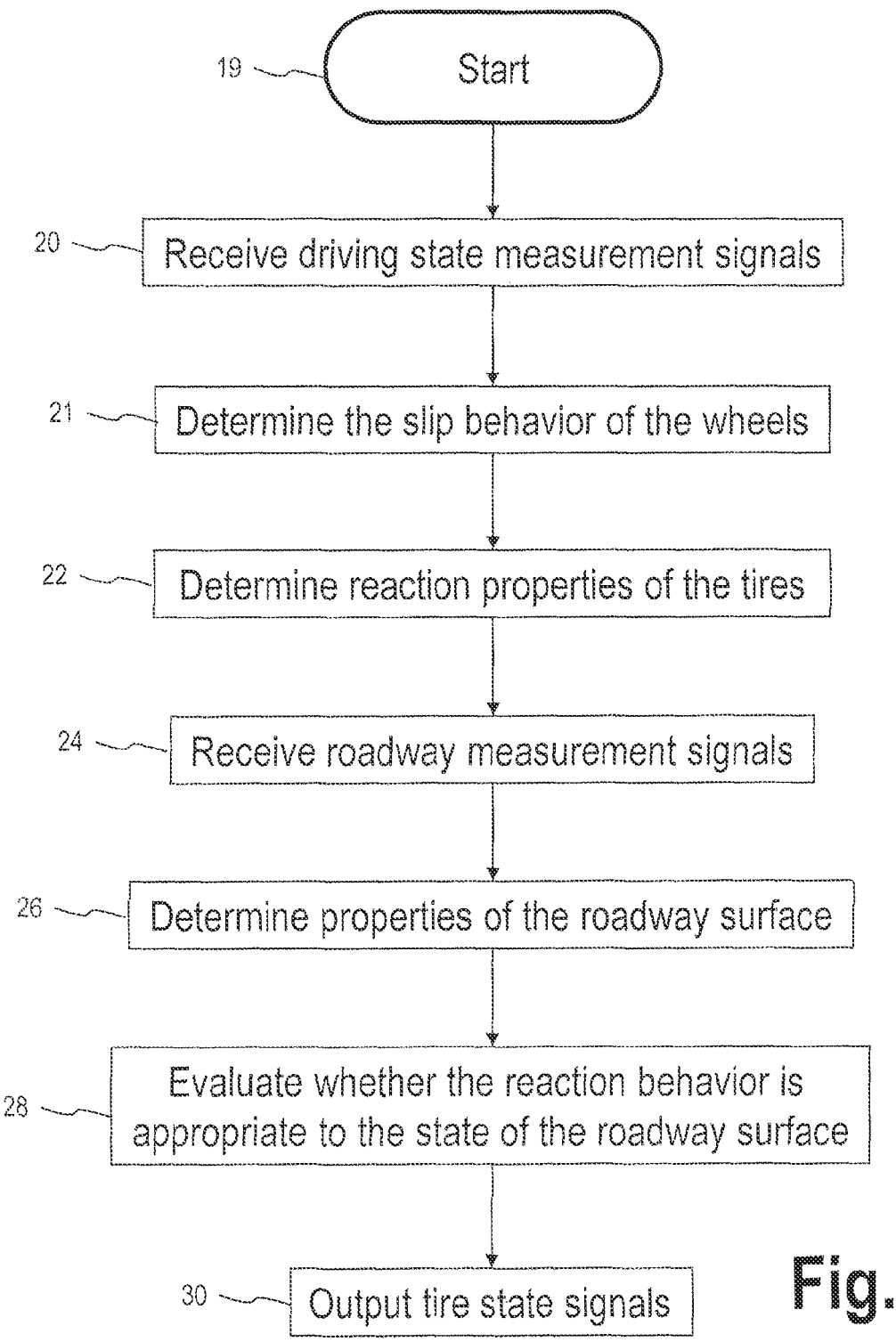
FIG. 3 is a flowchart of a method according to an embodiment of the invention.

After the start of the method in step 19, for example when the entire vehicle regulating system 7 starts, in step 20, 21 according to FIG. 3 reaction properties of the vehicle wheels 3, 6 are firstly determined, wherein these reaction properties are here the longitudinal slip tx and/or lateral slip ty. For this purpose, for example firstly in step 20 it is determined, from the measured driving state values or from the driving state values determined by means of the signals S1, S2, S3, whether appreciable longitudinal forces Fx or side forces Fy and/or acting torques M$\omega$ are present, for example whether a regulating intervention of the regulating system is present as a result of outputting of a braking control signal S6 to a brake 14 or can be present soon under certain circumstances. In step 21, the slip behavior of the wheels 3, 6 is then determined, for example at what forces Fx, Fy or torques M$\omega$, like the yaw torque indicated in FIG. 1, the tires lose grip, for example by means of the longitudinal slip tx in the case of an ABS intervention or traction control system intervention or by means of the slip angle $\alpha$ for the lateral slip ty.

In step 22, reaction properties of the tires 3a, 6a of the vehicle wheels 3, 6 are then determined, for example as coefficients of friction, from the acting forces Fx, Fy and/or torques M$\omega$ and the slip behavior tx, ty.

In step 24, the roadway measurement signals S4 are picked up.

In step 26, the determined properties of the roadway surface 2a are compared with the determined reaction properties of the tires 3a, 6a, in order to acquire data about the grip in the wet, aquaplaning properties and grip off-road and in snow. As a result, coefficients of friction can be acquired as a function of the water conditions.

In step 28, the tire state of the wheels 3, 6 is evaluated. As a result it is possible to evaluate whether the reaction behavior is appropriate to the state of the roadway surface, for example whether a low coefficient of friction corresponds to a relevant water film 12 or not. If no water film 12 or no ice or snow is detected, better reaction properties are to be expected, and otherwise it is possible to infer poor tire properties.

In step 30, it is possible to output, if appropriate, tire state signals S5, for example as warning signals, as a function of this determination if an inadequate tire state is detected, for example in the case of excessively poor reaction properties of the tires 3*a*, 6*a*. The tire state signals S5 can be output as display signals, for example to a display device in the vehicle 1 or for evaluation in the vehicle movement dynamics regulating system.

If tire wear sensors are provided in the tires 3*a*, 6*a*, the measurement signals of the sensors can be compared with the tire state properties determined. However, the determined tire state properties are more comprehensive and can also, for example, take into account hardening of the tread rubber mixture, unequal abrasion, in particular of the profile depth etc., of the tires 3*a*, 6*a*. If tire pressure sensors are also provided for measuring the air pressure in the tires 3*a*, 6*a*, the measurement signals thereof can be additionally used in order to take into account in step 26 the air pressure of the tires 3*a*, 6*a*, which air pressure correspondingly influences their grip and therefore the reaction to instabilities or possible slip.

It will thus be seen that the objects set forth above, among those made apparent from the preceding description, are efficiently attained, and since certain changes may be made in the above processes and constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A control device for a vehicle regulating system, comprising: electronics configured to:
   (i) receive driving state measurement signals transmitted from driving state sensors of the vehicle;
   (ii) determine reaction properties of wheels of the vehicle from the driving state measurement signals;
   (iii) receive roadway measurement signals of a spectroscopic sensor aligned with a roadway surface;
   (iv) determine properties of the roadway surface from the roadway measurement signals, the properties of the roadway surface comprising at least one of a presence and properties of a water layer on the roadway surface;
   (v) compare the properties of the roadway surface with the reaction properties of the tires; and
   (vi) evaluate whether determined reaction properties are appropriate for the properties of the roadway surface to determine tire properties of tires of the wheels.

2. The control device as claimed in claim 1, wherein, the electronics are configured to determine:
   a slip behavior of the vehicle wheels as the reaction properties of the vehicle wheels based on the driving state measurement signals;
   at least one of forces and torques acting at the vehicle wheels; and
   at least one of forces and torques at which at least one of a longitudinal slip and a lateral slip of individual ones of the vehicle wheels starts.

3. The control device as claimed in claim 2, wherein the electronics are configured to determine the slip behavior when the at least one of forces and torques are sufficiently large.

4. The control device as claimed in claim 2, wherein the electronics are configured to determine the at least one of forces and torques acting at the vehicle wheels from at least one of a longitudinal speed of the vehicle, a longitudinal acceleration of the vehicle, a lateral speed of the vehicle, a lateral acceleration of the vehicle, a yaw rate of the vehicle, and wheel speeds of the vehicle wheels.

5. The control device as claimed in claim 1, wherein the electronics are configured to determine the presence and at least one of a level and an aggregate state of the water layer on the roadway surface.

6. The control device as claimed in claim 5, wherein the electronics are configured to use setpoint reaction properties of the tires from stored data and compare the setpoint reaction properties with determined actual reaction properties of the tires, and output an output signal as a function of the comparison.

7. The control device as claimed in claim 6, further comprising a memory for storing initial new tire measurements as the setpoint reaction properties of the tires.

8. The control device as claimed in claim 5, wherein the reaction properties of the tires are friction values of the tires as a function of at least one of the aggregate state of the water layer and the level of the water layer.

9. The control device as claimed in claim 1, wherein the spectroscopic sensor is configured for spectroscopic measurements at least partially in the infrared range.

10. The control device as claimed in claim 2, wherein the electronics are configured, to determine the slip behavior when a regulating intervention of the vehicle regulating system commences.

11. The control device as claimed in claim 9, wherein the spectroscopic sensor is configured for spectroscopic measurements in three wavelength ranges comprising an absorption wavelength, for detecting water of about 1460 nm, an absorption wavelength for detecting ice of about 1550 nm and a reference wavelength without relevant absorption of water or ice.

12. A vehicle regulating system, comprising:
   the control device as claimed in claim 1;
   the driving state sensors configured to measure driving state measurement variables and output the driving state measurement signals to the control device; and
   the spectroscopic sensor aligned with the roadway surface, the spectroscopic sensor configured to output the roadway measurement signals to the control device,
   wherein the spectroscopic sensor is configured to determine at least one of an absorption behavior and a reflection behavior of the roadway surface in a wavelength suitable for water.

13. A method for determining at least one tire state of a vehicle tire, comprising:
   using driving state sensors of the vehicle to receive driving state measurement signals;
   determining reaction properties of wheels of the vehicle based on the driving state measurement signals;
   receiving roadway measurement signals of a spectroscopic sensor that is aligned with a roadway surface;

determining properties of the roadway surface based on the roadway measurement signals, the properties of the roadway comprising at least one of a presence and properties of a water layer on the roadway surface;

comparing the properties of the roadway surface with the reaction properties of the tires; and evaluating whether the determined reaction properties are appropriate for the properties of the roadway surface to determine tire properties of the tires.

* * * * *